Patented Feb. 21, 1933

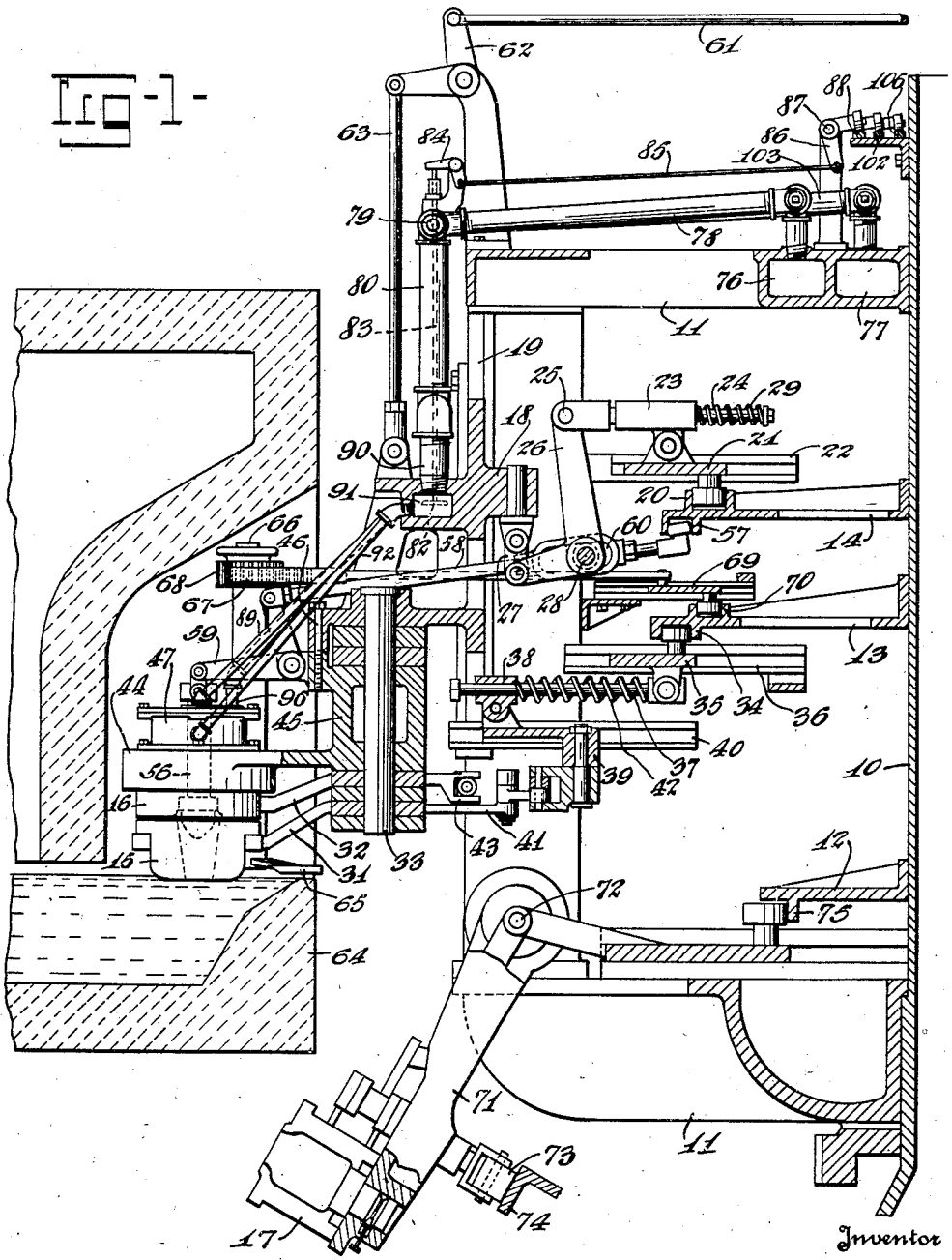

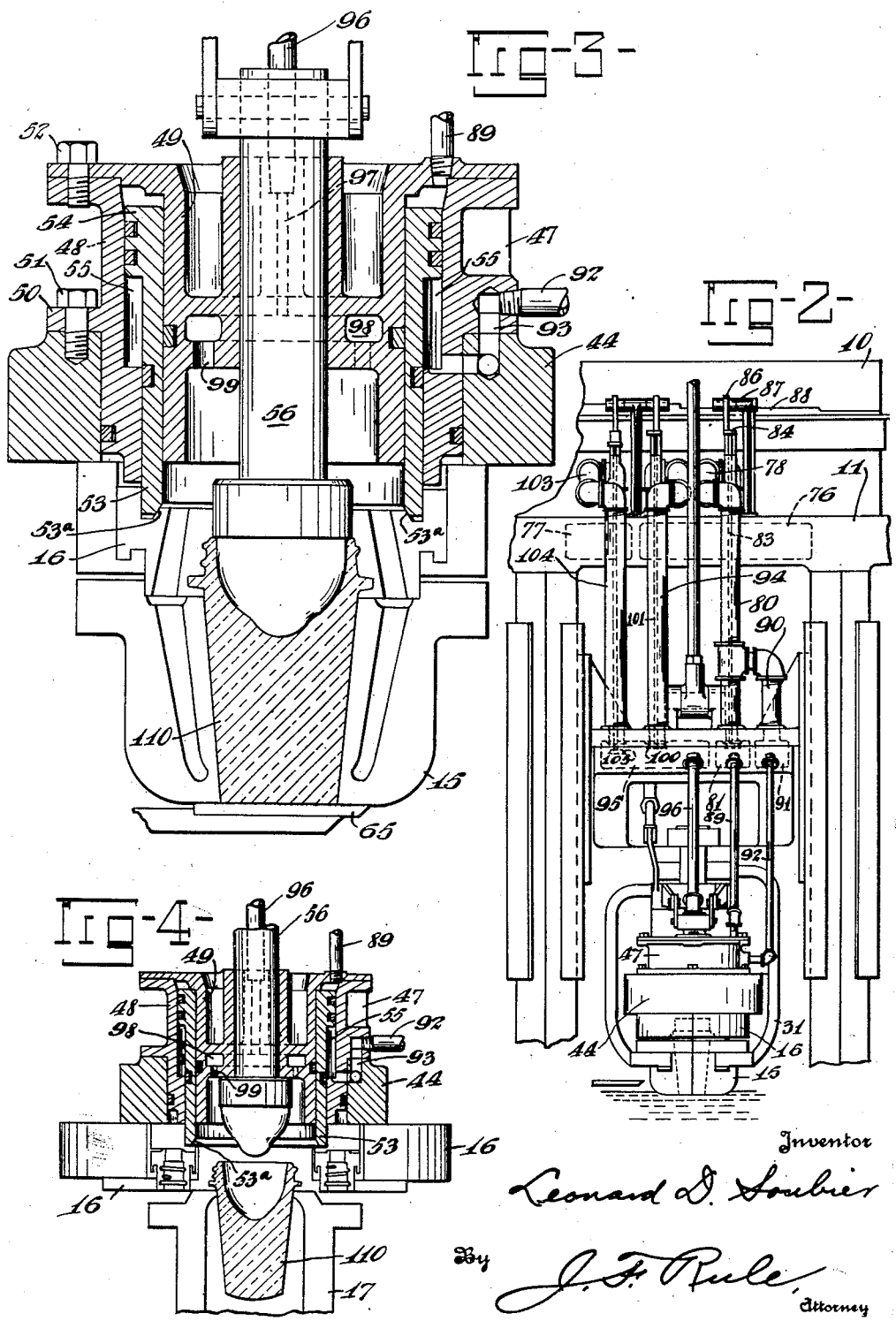

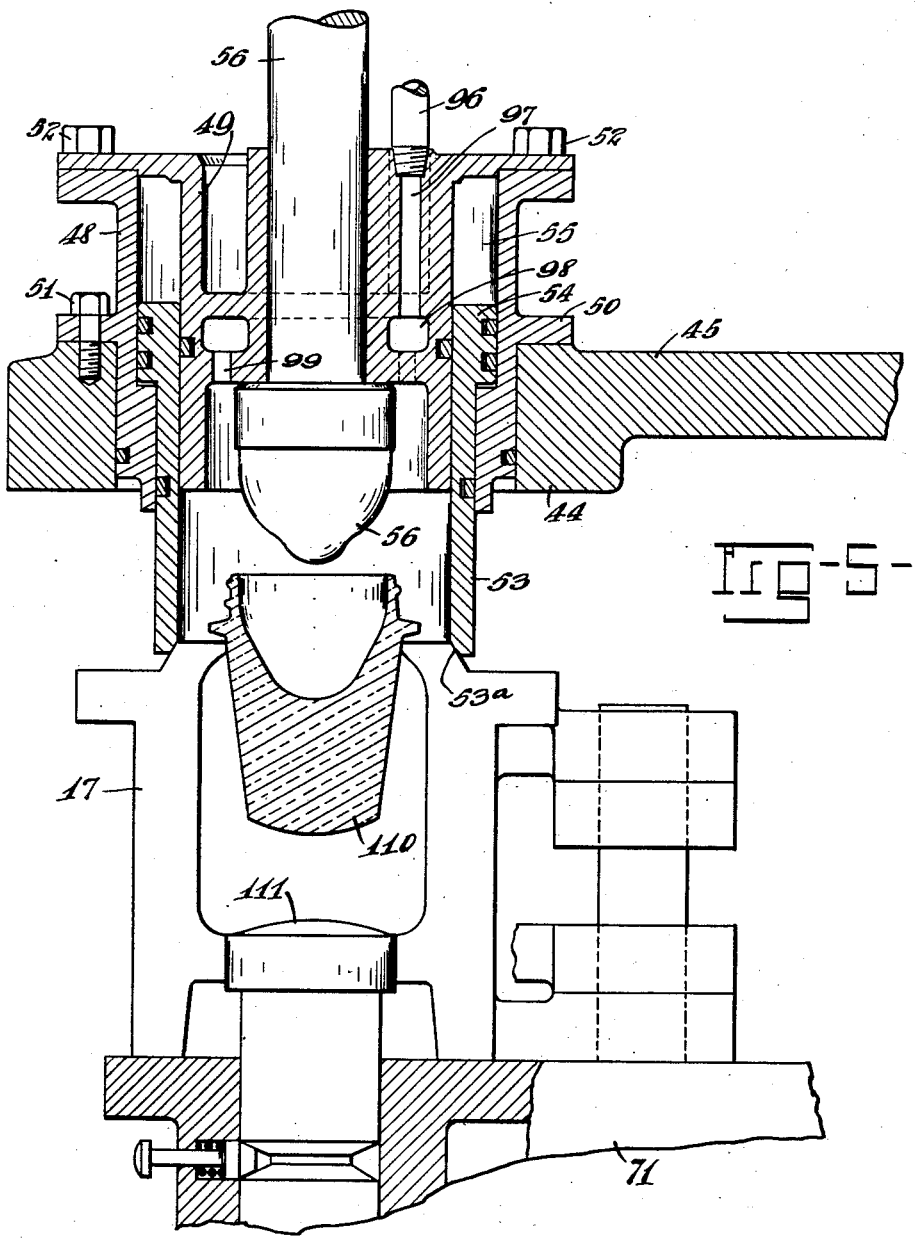

1,898,222

UNITED STATES PATENT OFFICE

LEONARD D. SOUBIER, OF TOLEDO, OHIO, ASSIGNOR TO OWENS-ILLINOIS GLASS COMPANY, OF TOLEDO, OHIO, A CORPORATION OF OHIO

GLASS BLOWING MACHINE

Application filed December 2, 1929. Serial No. 411,018.

My invention relates to machines for blowing hollow glass articles and as herein illustrated is embodied in a machine of the type in which the charges of glass are gathered by suction into the molds. Certain features of the invention are also applicable to other types of machines.

In machines for blowing hollow glass articles, it is customary to introduce the glass into a combined body blank and neck mold, give an initial formation to the parison, open the body blank mold and enclose the blank in a finishing mold, and then blow the parison to its final form in the finishing mold while the neck mold remains closed, after which the neck mold is opened and the article allowed to cool and set in the finishing mold before being discharged therefrom. This method necessitates the neck of the article being retained for a considerable length of time in the neck mold which, with many kinds of ware, results in excessively chilling the neck portion of the article and to a greater extent than the body portion, thereby producing strains, checks and other defects in the glass.

An object of the present invention is to overcome the above difficulty by providing a practical construction in which the neck mold can be opened before the article is blown in the finishing mold, and undue chilling of the neck of the article prevented.

A further feature of the invention is the provision of a suction type of machine in which the above object is obtained, and which, moreover, is more simple and compact than the suction machines now in general use.

Other objects of the invention will appear hereinafter.

In the accompanying drawings:

Fig. 1 is a sectional elevation of a machine constructed in accordance with my invention, parts of the machine being broken away.

Fig. 2 is a front elevation of one head or unit of the machine.

Fig. 3 is a front sectional elevation on a larger scale of the parison mold and combined suction and blowing head.

Fig. 4 is a sectional view showing the relation of parts after the finishing mold has closed around the parison, and the neck mold opened, but before the blowing cylinder has moved down to operative position.

Fig. 5 is a sectional view looking in a direction at right angles to that of Fig. 4, showing the parts in position for blowing the parison in the finishing mold.

Referring to Fig. 1, the blowing machine comprises a stationary central column 10 on which the mold carriage 11 is mounted for continuous rotation. The mold groups may be arranged as usual in an annular series on the mold carriage only one such mold group being illustrated. Stationary cam plates 12, 13, and 14 are mounted on the column 10 and formed with cam tracks for controlling the movements of the molds and other parts, as hereinafter pointed out.

Each mold group includes a parison mold comprising a body blank mold 15 and neck mold 16, and a finishing mold 17, each mold comprising partible sections. The molds 15 and 16 which together form the glass gathering mold, are supported on a dip frame 18 which is mounted to move up and down on vertical guides 19 on the mold carriage. The up and down movements of the dip frame are effected by a cam track 20 on the plate 14. The operating connections between the dip frame and cam 20 comprise a slide block 21 which reciprocates radially of the machine in guides 22 on the mold carriage, a sleeve 23 pivoted to the block 21 and mounted on a rod 24 having a pivotal connection 25 to one arm of a bell crank 26, the other arm of which is connected through a link 27 to the dip frame 18. The bell crank 26 is fulcrumed on a pivot pin 28 on the mold carriage. A coil spring 29 mounted on the rod 24 provides a safety device permitting the slide block 21 to move inward without lifting the dip frame in the event of any obstruction to the upward movement of said frame.

The blank mold sections 15 and neck mold sections 16 are carried respectively on arms 31 and 32, which arms are pivotally mounted on a vertical pivot pin 33 on the dip frame. The opening and closing movements of the mold sections 15 are controlled by a cam track 34 on the plate 13, on which track runs a roll carried by a slide block 35 which reciprocates radially of the mold carriage in guides 36. A rod 37 pivoted to the slide plate 35 has a slidable connection with a head 38 pivoted to a slide plate 39 which reciprocates in guides 40 secured to the dip frame 18. The plate 39 has operating connections 41 with the blank mold arms 31. A coil spring 42 mounted on the rod 37 provides the usual safety device and means for holding the blank mold closed under spring tension. The neck mold sections 16 may be separated as usual by the final opening movement of the blank mold operating through connections 43. Mechanism such as shown in the patent to Richard LaFrance, No. 1,185,687, June 6, 1916, may be used for this purpose, if desired.

Directly above the neck mold 16 is an annular supporting member or ring 44 formed integral with a section 45 of the dip frame 18. The section 45 is secured to the dip frame by bolts 46 and provides a bearing support for the mold arms and the pivot pin 33.

Mounted on the ring 44 is a combined suction and blowing head 47 which comprises an outer cylindrical member 48 and an inner cylindrical member 49. The member 48 is formed with an annular flange 50 which seats on the ring 44 and is secured thereto by bolts 51. The members 48 and 49 are secured together by bolts 52 which extend through flanges formed on said members. The inner member 49 is of smaller external diameter than the internal diameter of the member 48, thereby providing an annular space to receive a blowing cylinder 53 which reciprocates vertically. The upper end of the cylinder 53 is enlarged to form an annular piston head 54. Provision is made for periodically supplying air under pressure to the annular space above the head 54 for lowering the cylinder 53, while air pressure is continuously maintained in the annular space 55 beneath the head 54 for lifting the cylinder, all as hereinafter set forth. The lower end of the cylinder is formed with a beveled annular surface 53$^a$ which engages correspondingly beveled surfaces formed on the neck mold and finishing mold when the cylinder is moved down into engagement with said molds respectively. The cylinder thus serves to hold the mold tightly closed and also makes a substantially air tight seal at said annular surface.

A plunger 56 for forming the initial blow opening in the parison, is operated by a cam 57 (Fig. 1) on the lower face of the cam plate 14. The operating connections between the cam 57 and the plunger comprises a rod 58 and a bell crank lever 59 pivoted to the section 45 of the dip frame. The rod 58 is formed with a slot or loop 60 through which the pivot pin 28 extends, thus providing a support for the rod 58 while permitting movement of the rod in the direction of its length. The weight of the dip frame and parts carried thereby may be counterbalanced as usual by a counterweight (not shown) within the column 10, said weight having connections with the frame through a rod 61, bell crank lever 62 and rod 63.

The blank mold 15 dips into a pool of molten glass in a tank 64 and gathers its charge by suction. When the mold is lifted from the supply body of glass, a knife 65 shears across the bottom of the mold and severs the charge of glass in the mold from the supply body. The knife is mounted on a vertical rock shaft 66 and is actuated by a rack bar 67 in engagement with a pinion 68 on the rock shaft. The rack bar 67 is connected to a slide plate 69 actuated by a cam 70 on the cam plate 13.

The finishing mold 17 is mounted on a frame 71 which swings downward about a fulcrum 72 on the mold carriage to clear the tank 64, and swings up to horizontal position to receive the parison. A roll 73 on the frame 71 runs on a stationary cam track 74 shaped to effect the swinging movements of said frame. The opening and closing movements of the finishing mold are controlled by a cam 75 on the plate 12 operating through the usual well known connections.

The air and vacuum mechanism will now be described. An air pressure chamber 76 and a vacuum chamber 77 are formed in the upper part of the mold carriage as usual. Air pressure for lowering the blowing cylinder 53 is supplied from the pressure chamber 76 through an air line which comprises a pipe 78 extending radially outward from the chamber 76 and having a pivotal connection 79 with a vertical pipe 80 which communicates at its lower end with a valve chamber 81 (Fig. 2) formed in the dip frame 18. A valve 82 in the chamber 81 controls communication between said chamber and the pipe 80. Said valve has a stem 83 extending upward through the pipe 80 into position to be operated by a bell crank 84 connected through a link 85 to a bell crank lever 86 fulcrumed at 87 and carrying a roll running on a stationary cam 88. When the cam 88 operates through the connections just described to lower the valve 82, air under pressure is supplied from the chamber 76 through the air line including pipes 78 and 80 to the valve chamber 81 and thence through a pipe 89 leading from the valve chamber 81 to the head 47, said pipe opening into the annular space 55 at a point above the piston head 54. The air pressure thus supplied serves to lower the blowing cylinder 53.

Leading from the pipe 80 (Fig. 2) is a branch pipe 90 opening into a chamber 91 from which a pipe 92 extends to the side of the head 47 (Fig. 3). A passageway 93 extends from the pipe 92 to the lower end of the annular space 55, thereby maintaining continuous air pressure beneath the piston head 54. This pressure serves to raise the blowing cylinder 53 when the air pressure through the pipe 89 is cut off.

Air under pressure for blowing the glass in the molds is supplied from the air pressure chamber 76 through a pipe line 94 extending to a chamber 95 in the dip frame. A pipe 96 extends diagonally downward and forward from the chamber 95 to the head 47. The air line extends from the pipe 96 through a vertical passageway 97 (Figs. 3 and 5) to an annular channel 98 opening through parts 99 into the blowing cylinder 53. A valve 100 (Fig. 2) controls the air supply through this line. Said valve is located in the chamber 95 and connected to a valve stem 101 extending upward through the pipe 94 and having operating connections with a cam 102 (Fig. 1), said connections being substantially similar to those for operating the valve 82.

The vacuum line for exhausting air from the molds comprises pipes 103 and 104 leading from the vacuum chamber 77 to the chamber 95. A valve 105 controls this vacuum line, said valve being operated by a cam 106 (Fig. 1) through connections such as shown and described for the valve 82. When the valve 100 is closed and the valve 105 opened, the air is exhausted from the cylinder 53 through the vacuum line including pipes 103, 104, chamber 95, pipe 96, and passageways 97, 98, and 99.

*Operation*

As the mold carriage rotates, the blank molds are brought in succession to a charge gathering position over the tank 64. When the blank mold reaches such position, the dip frame 18 is lowered under the control of the cam 20 and the mold thereby dipped to gather its charge of glass. At this time the blank mold and neck mold are in closed position and the blowing cylinder 53 in engagement with the neck ring 16 (Fig. 3). The cylinder 53 is held in such position by air under pressure above the cylinder head 54, the valve 82 (Fig. 1) at this time being held open by the cam 88 to admit air under pressure from the pressure chamber 76 through the air line including pipes 78, 80, and 89.

The cam 106 (Fig. 1) now operates to open the valve 105 (Fig. 2), thus connecting the interior of the blank mold with the vacuum chamber 77 so that the air is exhausted from the blank and neck molds and a charge of glass 110 drawn into the molds.

The dip head 18 is now raised to lift the mold out of dip and the knife 65 is then operated to sever the glass and close the bottom of the mold. After the glass is severed, the vacuum controlling valve 105 is closed. The plunger 56 is then withdrawn under the influence of the cam 57. If desired, an initial puff of air may now be applied to compact the glass in the blank and neck mold. This is effected by causing the cam 102 (Fig. 1) to momentarily open the valve 100 (Fig. 2) to connect the pressure chamber 76 to the mold cavity through the air line including the pipes 94 and 96. The cutter blade 65 remains in mold closing position (Fig. 3) during this initial blowing of the parison and is then withdrawn. The blank mold is now opened by means of the cam 34, leaving the bare parison suspended from the neck mold.

The blank mold has by this time passed beyond the tank 64 and the finishing mold frame 71 is carried upward on the track 74 to bring the finishing mold 17 up to a level with the blank mold. The cam 75 now operates to close the finishing mold around the suspended parison. The neck mold 16 is next opened by the final opening movement of the blank mold, leaving the parison supported in the finishing mold as shown in Fig. 4. Prior to opening of the neck mold, the blowing cylinder 53 is raised from the Fig. 3 position to the Fig. 4 position to release the neck mold. This is effected by closing the valve 82 and thereby cutting off the air pressure above the cylinder head 54. This permits the air pressure which is maintained continuously beneath the head 54, to lift the cylinder 53 so as to clear the neck mold.

After the neck mold has opened, the valve 100 is again opened to supply air above the cylinder head 54 and thereby lower the blowing cylinder into engagement with the finishing mold 17, as shown in Fig. 5. The cam 102 now operates to open the valve 100 and supply air under pressure to the cylinder 53, so that the parison is blown to its final form in the finishing mold. The final blowing pressure is preferably maintained for a substantial period of time after the article has been blown to final form, thereby holding the glass in intimate contact with the mold walls and shortening the time required for cooling the article. After this blowing operation is terminated, the finishing mold may be swung downward as a preliminary to discharging the article. The article may be discharged from the machine in the usual manner by opening the finishing mold and allowing the article to drop from the mold bottom 111, or the article may be removed by means of an implement or take-out device engaging the neck portion before the mold opens.

Modifications may be resorted to within the spirit and scope of my invention.

What I claim is:

1. In a machine for forming hollow glass articles, the combination of a blowing head, a body mold, a neck mold between said head and body mold and in register with the body mold, a plunger extending through the blowing head, and means for projecting the plunger into and withdrawing it from the neck mold, means for withdrawing the neck mold, and means for establishing connection between the blowing head and body mold after the neck mold is withdrawn.

2. In a machine for forming hollow glass articles, the combination of a blowing head, a body mold, a neck mold between said head and body mold and in register with the body mold, a plunger extending through the blowing head, and means for projecting the plunger into and withdrawing it from the neck mold, means for withdrawing the neck mold, and means for supplying air under pressure through the blowing head to the neck mold before it is withdrawn, and to the body mold after the neck mold has been withdrawn.

3. In a machine for blowing glass articles, the combination of a combined suction and blowing head, a blank mold, a neck mold in register therewith, means for exhausting the air from said molds through said head, a finishing mold, and means for applying air under super-atmospheric pressure through said head to the finishing mold independently of the neck mold.

4. The combination of a blank mold, a neck mold in register therewith, a combined suction and blowing head in register with the neck mold, means for applying suction through said head and thereby exhausting the air from said molds, means for applying air under pressure through said head to the molds, means for withdrawing the blank mold, a finishing mold, means for bringing the finishing mold into register with the neck mold, means for withdrawing the neck mold, and means for applying air under pressure to the finishing mold after the neck mold is withdrawn.

5. The combination of a blank mold, a neck mold in register therewith, a combined suction and blowing head in register with the neck mold, means for applying suction through said head and thereby exhausting the air from said molds, means for applying air under pressure through said head to the molds, means for withdrawing the blank mold, a finishing mold, means for bringing the finishing mold into register with the neck mold, means for withdrawing the neck mold, and means for applying air under pressure through said head to the finishing mold after the neck mold is withdrawn.

6. The combination of a blank mold, a neck mold, a finishing mold, means for bringing the blank mold and finishing mold alternately into register with the neck mold, a blowing head, means for supplying air pressure through the blowing head to the neck mold and blank mold, and means for bringing said blowing head alternately into operative relation to the neck mold and to the finishing mold independently of the neck mold.

7. The combination of a blank mold, a neck mold, a finishing mold, means for bringing the blank mold and finishing mold alternately into register with the neck mold, a blowing head, and means for bringing said blowing head into operative relation to the neck mold while the blank mold is in register therewith and to the finishing mold while the latter is out of register with the neck mold.

8. The combination of a neck mold, a body blank mold, a finishing mold, a blowing head, means for bringing the blank mold and finishing mold alternately into register with the neck mold, means for bringing the blowing head into register with the neck mold while the latter is in register with the blank mold, and means for bringing the blowing head alternately into register with the finishing mold and with the neck mold while the latter is in register with the finishing mold.

9. The combination of a neck mold, a body blank mold, a finishing mold, means for bringing the neck mold and blank mold into register, a combined suction and blowing head, means for bringing said head into register with the neck mold while the latter is in register with the blank mold, means for applying suction through said head to the neck mold and blank mold, means for bringing said head into register with the finishing mold independently of the neck mold, and means for applying air under pressure through said head to the finishing mold.

10. In a machine for forming hollow glass articles, the combination of a mold carriage rotatable horizontally, a dipping frame thereon, a gathering mold carried on the dipping frame, means for lowering said frame and thereby bringing the mold into contact with a supply body of molten glass, means for introducing a charge of glass by suction into the mold, a blowing head carried on the dipping frame above the mold, and pneumatic means for moving said head vertically into and out of operative engagement with the mold.

11. In a machine for forming hollow glass articles, the combination of a mold carriage rotatable horizontally, a dipping frame thereon, a gathering mold carried on the dipping frame, means for lowering said frame and thereby bringing the mold into contact with a supply body of molten glass, means for introducing a charge of glass by suction into the mold, a blowing head carried on the dipping frame above the mold, a finishing mold mounted on the mold carriage separately from the dipping frame, and means for moving the finishing mold toward and from the blowing head, said blowing head being movable alternately into operative engagement with the gathering mold and finishing mold.

12. In a machine for forming hollow glass articles, the combination of a blowing head comprising a casing including inner and outer relatively fixed cylindrical sections formed to provide an annular space therebetween, a headed cylinder mounted to reciprocate in said space, means for supplying air under pressure for actuating said cylinder, a parison mold in register with said cylinder, means for exhausting the air from said mold through said cylinder, a finishing mold, means for transferring a parison from the parison mold to the finishing mold and for bringing the latter into register with said cylinder, and means for supplying air under pressure through said cylinder and thereby expanding the parison in the finishing mold.

13. In a machine for forming hollow glass articles, the combination of a blowing head comprising a casing including inner and outer relatively fixed cylindrical sections formed to provide an annular space therebetween, a headed cylinder mounted to reciprocate in said space, means for supplying air under pressure for actuating said cylinder, a mold adapted to register with said cylinder, said inner section of the casing being formed with a central cylindrical bore, a plunger extending therethrough, and means for moving the plunger into and out of the mold.

14. The combination of a body mold, a neck mold, a plunger projecting into the neck mold, means for withdrawing the plunger, a blowing cylinder surrounding the plunger, and means for moving said cylinder to and from the neck mold.

Signed at Toledo, Ohio, this 29th day of November, 1929.

LEONARD D. SOUBIER.